(12) United States Patent
Babazadeh et al.

(10) Patent No.: US 9,698,683 B2
(45) Date of Patent: Jul. 4, 2017

(54) METHOD AND APPARATUS FOR CONTROLLER OPTIMIZATION OF A SWITCHING VOLTAGE REGULATOR

(71) Applicant: Infineon Technologies Austria AG, Villach (AT)

(72) Inventors: Amir Babazadeh, Laguna Hills, CA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 411 days.

(21) Appl. No.: 14/328,931

(22) Filed: Jul. 11, 2014

(65) Prior Publication Data
US 2016/0013719 A1    Jan. 14, 2016

(51) Int. Cl.
*G06F 19/00* (2011.01)
*H02M 3/157* (2006.01)

(52) U.S. Cl.
CPC ................... *H02M 3/157* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,786,265 | B2* | 7/2014 | Manlove | H02M 3/157 323/282 |
| 8,953,123 | B2* | 2/2015 | Harayama | G02F 1/133308 349/110 |
| 2002/0144163 | A1* | 10/2002 | Goodfellow | H02J 1/102 713/300 |
| 2005/0162174 | A1* | 7/2005 | Huang | B23K 26/04 324/520 |
| 2013/0162200 | A1* | 6/2013 | Terry | H02J 5/005 320/108 |
| 2014/0002044 | A1* | 1/2014 | Babazadeh | H02M 3/1588 323/282 |

OTHER PUBLICATIONS

Yao, et al., "Adaptive Voltage Regulator Position Design for Voltage Regulators", IEEE, Virginia Polytechnic Institute and State University, The Bradley Department of Electrical and Computer Engineering, 2004, pp. 272-278.

* cited by examiner

*Primary Examiner* — Kidest Bahta
(74) *Attorney, Agent, or Firm* — Murphy, Bilak & Homiller, PLLC

(57) ABSTRACT

Control loop coefficients for a digital voltage regulator controller are determined by determining PID (proportional-integral-derivative) coefficients that satisfy gain and phase margin targets for a digital voltage regulator controller, as a function of a plurality of system parameters for the digital voltage regulator controller, and re-determining one or more of the PID coefficients to flatten an output impedance response of the digital voltage regulator controller for frequencies below a bandwidth of the digital voltage regulator controller.

19 Claims, 12 Drawing Sheets

METHOD AND APPARATUS FOR CONTROLLER OPTIMIZATION OF A SWITCHING VOLTAGE REGULATOR

TECHNICAL FIELD

The present application relates to switching voltage regulators, in particular improving transient response by optimizing voltage loop and current loop response to flatten the output impedance response of switching voltage regulators.

BACKGROUND

Switching voltage regulators such as DC-DC regulators are widely used in modern electronic systems for a variety of applications such as computing (server and mobile) and POLs (Point-of-Load Systems) for telecommunications because of their high efficiency and small amount of area/volume consumed by such converters. Widely accepted switching voltage regulator topologies include buck, boost, buck-boost, forward, flyback, half-bridge, full-bridge, and SEPIC topologies. Multiphase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOSFETs (metal-oxide-semiconductor field-effect transistors), and passive components such as inductors, transformers or coupled inductors, capacitors, and resistors. Multiple phases (power stages) can be connected in parallel to the load through respective inductors to meet high output current requirements.

Some switching voltage regulators implement AVP (adaptive voltage position, also referred to as droop compensation and load line). In an AVP-based voltage regulator system, a key criteria for the voltage regulator design is to meet the output impedance requirement over frequency in order to achieve good transient response. The regulator controller can include a compensator designed to flatten the output impedance response in order to obtain a constant resistive output impedance. As long as the output impedance is constant within the control bandwidth and the impedance beyond the bandwidth is smaller than that, AVP can still be achieved. Under these conditions, the phase margin is typically larger than 60 degrees. Otherwise, a peak or bump occurs in the output impedance curve. Conventional AVP design methodologies set the control bandwidth to match the ESR (equivalent series resistance) zero and ensure that the impedance beyond the ESR zero is less than the droop resistance. However, a phase margin of at least 60 degrees cannot always be obtained e.g. when the regulator controller implements a very low switching frequency to achieve greater efficiency. A significant peak or bump arises in the output impedance response of the regulator under these conditions using conventional AVP design methodologies. Output impedance is an effective measure for evaluating the load transient response of a switching voltage regulator. A relatively flat output impedance curve yields a more ideal regulator response. Hence, peaks or bumps in the closed-loop impedance curve are undesirable and may lead to a less than ideal regulator response.

SUMMARY

According to an embodiment of a method of determining control loop coefficients for a digital voltage regulator controller, the method comprises: determining PID (proportional-integral-derivative) coefficients that satisfy gain and phase margin targets for the digital voltage regulator controller, as a function of a plurality of system parameters for the digital voltage regulator controller; and re-determining one or more of the PID coefficients to flatten an output impedance response of the digital voltage regulator controller for frequencies below a bandwidth of the digital voltage regulator controller.

According to an embodiment of a non-transitory computer readable medium storing a computer program operable to determine control loop coefficients for a digital voltage regulator controller, the computer program comprises: program instructions to determine PID (proportional-integral-derivative) coefficients that satisfy gain and phase margin targets for the digital voltage regulator controller, as a function of a plurality of system parameters for the digital voltage regulator controller. The computer program further comprises program instructions to re-determine one or more of the PID coefficients to flatten an output impedance response of the digital voltage regulator controller for frequencies below a bandwidth of the digital voltage regulator controller.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIGS. 5 through 8, which include FIGS. 5, 6, 7A, 7B, 8A, and 8B, illustrate screen captures for the regulator parameter programming system of FIG. 1 during different stages of the parameter optimization process.

DETAILED DESCRIPTION

Embodiments described herein optimize the control loop coefficients for a digital voltage regulator controller to meet the requirements of the voltage regulator system over a wide range of operating conditions, while also flattening the output impedance response. The control loop coefficients can be optimized by determining an initial set of coefficients that satisfy gain and phase margin targets for the voltage regulator controller, as a function of a plurality of system parameters for the voltage regulator controller. A peak (bump) in the output impedance response is identified over a frequency range of interest, and one or more of the control loop coefficients are re-determined such that the peak in the output impedance response is reduced. The embodiments described herein provide an iterative approach for aggressive control loop implementation where the phase margin impacts the peaking, and the control loop coefficients are optimized subject to a minimal peaking condition. To this end, a digital controller configuration approach is provided that uses a system model (including board and component parasitics, driver delay, etc.), loop and output impedance analysis, and configurable gain/bandwidth parameters for multiple modes of operation. The methods described herein can be applied to PID (proportional-integral-derivative), AVP (adaptive voltage position) and current balance control optimization. The optimization process can be applied all of the control loop coefficients, or to some of the coefficients and the rest can be adjusted manually.

Figure 1:
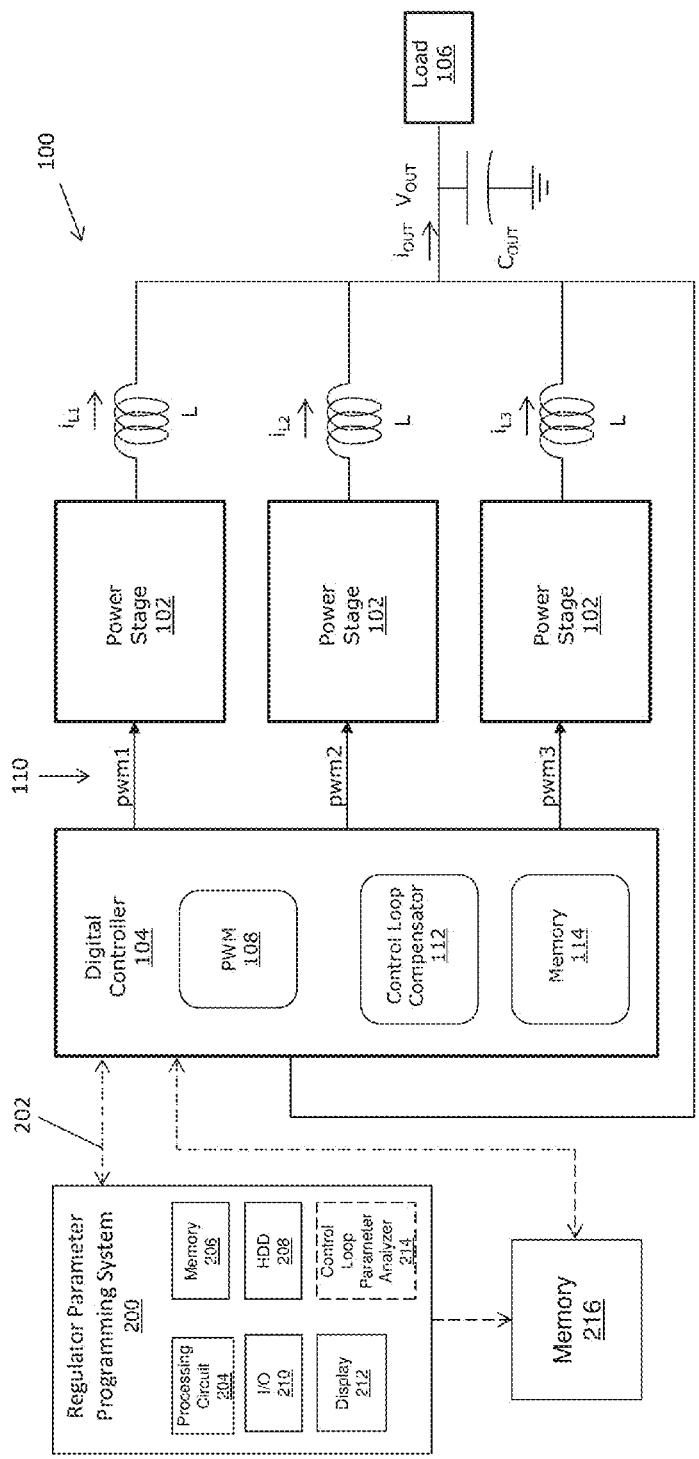
FIG. 1 illustrates a block diagram of an embodiment of a multiphase switching voltage regulator having a control loop compensator, and a programming system for determining control loop coefficients for the control loop compensator.

FIG. 1 illustrates an embodiment of a switching voltage regulator 100 such as a DC-DC regulator and a programming system 200 such as a computer, server or other electronic device for programming control loop coefficients of the switching voltage regulator 100. The switching voltage regulator 100 comprises a plurality of power stages 102 and a digital controller 104 such as a microcontroller, microprocessor, ASIC (application-specific integrated-circuit), etc. for controlling operation of the power stages 102. Three power stages (phases) 102 are shown in FIG. 1 for exemplary purposes only, however the voltage regulator 100 can include any number of power stages 102 including a single power stage 102 (i.e. single-phase regulator) or more than one power stage 102 (i.e. multiphase regulator).

The power stages 102 provide a regulated voltage to a load 106. Each power stage 102 is operable to deliver a phase current through one or more inductors (L) to the load 106 which is connected to the voltage regulator 100 via the inductors and one or more output capacitors (Cout) in parallel with the regulator output. The load 106 can be a high-performance integrated circuit such as a microprocessor, graphics processor, network processor, etc. or other type of electronic circuit requiring voltage regulation. Each power stage 102 connects the load 106 to an input voltage of the voltage regulator 100 in a first switching state and to ground in a second switching state.

The digital controller 104 manages the switching states of each power stage 102 to regulate the voltage (Vout) delivered to the load 106, by adjusting the phase currents delivered to the load 106. In the case of PWM (pulse width modulation) based switching of the power stages 102, the controller 104 includes a PWM unit 108 that generates PWM control signals (pwm) for switching the power stages 102. If the load current is low (e.g. lower than half of the phase current), synchronous converters allow the negative current (reverse current) to flow through low-side switches of one or more of the power stages 102 where it is dissipated. However if a low-side switch is off, the corresponding body diode cannot conduct the reverse current and it stays in HiZ (high impedance) or zero current which is called DCM (discontinuous conduction mode). The voltage regulator 100 can also operate in a continuous conduction mode (CCM) with current sinking capability. In general, the switching state and duty cycle of the individual power stages 102 are determined at least in part based on the output voltage (Vout) provided to the load 106 so that the voltage regulator 100 can react quickly and reliably as possible to changing load conditions.

The digital controller 104 can manage changes from one reference voltage to another. The controller 104 can also determine errors between the output voltage (Vout) and a reference voltage, and convert the error voltage into a digital representation provided to the PWM unit 108 for modifying the switching state and/or duty cycle of the power stages 102 e.g. by adjusting the duty cycle of the PWM control signals. Such voltage regulation functions are standard in typical digitally-controlled switching power converters, and therefore no further explanation is given in this regard. A signalling interface 110 is provided between the controller 104 and the power stages 102. Among other functions, the controller 104 can manage different power modes of the power stages 102 via the interface 110.

The digital controller 104 also includes a control loop compensator 112 programmed to satisfy gain and phase margin targets for the voltage regulator controller 104, as a function of a plurality of system parameters for the voltage regulator controller 104. The control loop compensator 112 is programmed to maintain the overall output impedance response as smooth (flat) as possible. The control bandwidth initially can be set to match the ESR (equivalent series resistance) zero and ensure that the impedance beyond the ESR zero is less than the droop resistance. Under some operating conditions, e.g. when the regulator controller 104 implements a very low switching frequency to achieve greater efficiency, the phase margin target (e.g. at least 60 degrees) cannot always be obtained. One or more of the control loop coefficients can be re-determined such that the resulting peak (bump) in the output impedance magnitude is reduced and the response is flattened.

The control loop coefficients implemented by the control loop compensator 112 are optimized by the regulator parameter programming system 200, and can be stored in the digital controller 112 in volatile or non-volatile memory 114 such as EEPROM, flash, RAM, register file, etc. The regulator parameter programming system 200 can be connected to the digital controller 104 via a wired or wireless connection 202. The regulator parameter programming system 200 includes a processing circuit 204 which can include digital and/or analog circuitry such as one or more controllers, processors, ASICs (application-specific integrated circuits), etc. for executing program code which determines various settings of the digital controller 104, including the control loop coefficients implemented by the control loop compensator 112. The regulator parameter programming system 200 further includes memory 206 such as DRAM (dynamic random access memory) and an HDD (hard disk drive) or other mass storage drive(s) 208 for storing the program code and related data processed and accessed by the processing circuit 204 during execution of the program code. The regulator parameter programming system 200 also includes I/O (input/output) circuitry 210 for sending and receiving information and a display 212 for enabling a graphical user interface (GUI). A control loop parameter analyzer 214 included in or associated with the regulator parameter programming system 200 optimizes the control loop coefficients implemented by the control loop compensator 112.

Figure 2:
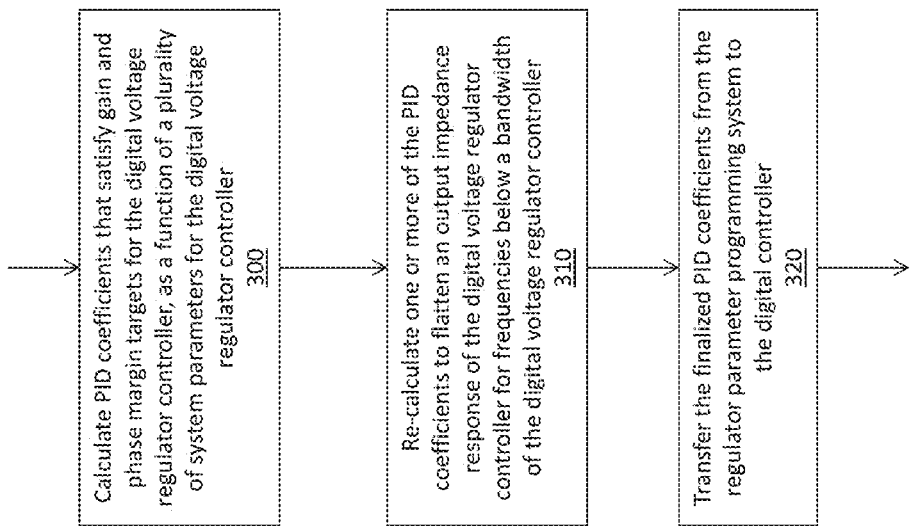
FIG. 2 illustrates a flow diagram of an embodiment of a method of determining control loop coefficients for a digital voltage regulator controller.

FIG. 2 illustrates an embodiment of a method implemented by the regulator parameter programming system 200 for optimizing the control loop coefficients implemented by the control loop compensator 112 of the digital voltage regulator controller 104. According to this embodiment, the control loop compensator 112 includes at least a PID (proportional-integral-derivative) based compensation filter for the voltage control loop. The method comprises determining PID coefficients that satisfy gain and phase margin targets for the digital voltage regulator controller 104, as a function of a plurality of system parameters for the digital controller 104 (Block 300). The system parameters can include output capacitance (Cout), output inductance (L), parasitics, DCR of the output inductor, ESR of the output capacitor, etc. As previously explained herein, the phase margin target (e.g. at least 60 degrees) cannot always be obtained under some operating conditions and an undesirable peak (bump) occurs in the output impedance response. The regulator parameter programming system 200 re-determines one or more of the PID coefficients such that the peak (bump) in the output impedance magnitude is reduced and the response is flattened (Block 310). This iterative approach of determining the control loop coefficients implemented by the control loop compensator 112 yields improved regulator performance. The finalized PID coefficients are transferred from the regulator parameter programming system 200 to the digital controller 104 via the wired or wireless connection 202 (Block 320).

Figure 3:
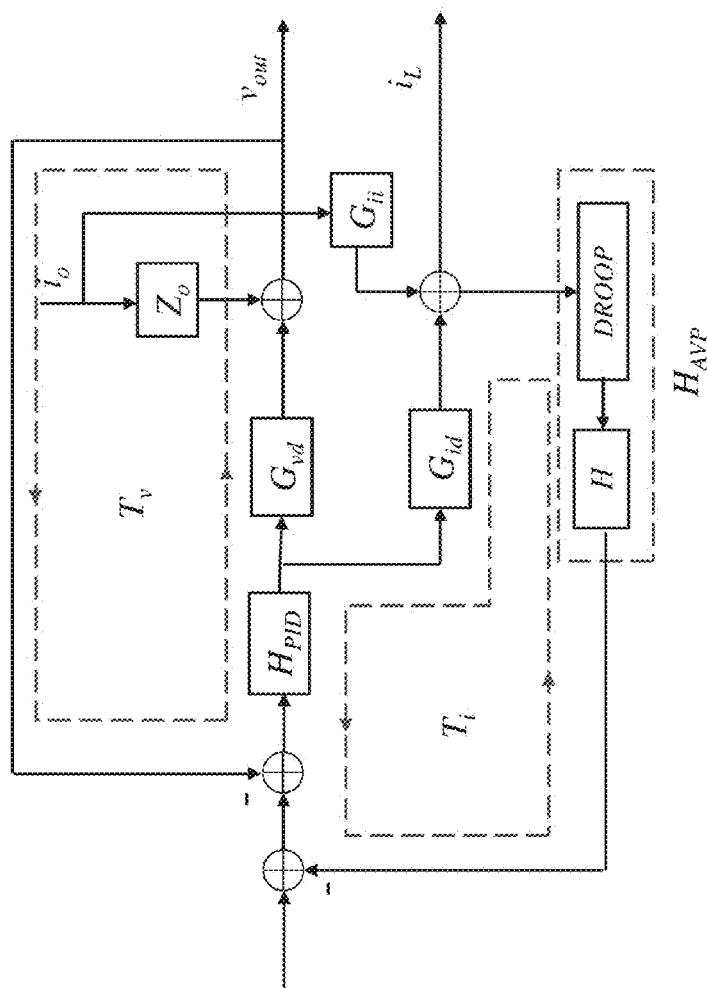
FIG. 3 illustrates a block diagram of an embodiment of a control loop compensator for a switching voltage regulator.

FIG. 3 illustrates a block diagram of an embodiment of the control loop compensator 112. According to this embodiment, the control loop compensator 112 includes a single-pole, two-zero PID compensation filter for the voltage control loop ($T_v$), a single-pole AVP or dominant-pole low pass filter in the current control loop ($T_i$) which affects the AVP frequency response, and a single-pole post filter or dominant pole low pass filter cascaded with the PID compensation filter for limiting high frequency gain. In general, AVP is a technique for controlling the output voltage level so that it is slightly higher than the minimum value at full load, and a little lower than the maximum value at light load. As a result, the entire voltage tolerance window can be used for the voltage jump or drop during the transient period.

In FIG. 3: $H_{PID}$ is the compensator transfer function; $G_{vd}$ is the transfer function from duty cycle to the output voltage (Vout); $G_{id}$ is the transfer function from duty cycle to inductor current ($i_L$); $G_{ii}$ is the transfer function from the output current ($i_{out}$) to inductor current; $Z_o$ is the open-loop output impedance; and $H_{AVP}$ is the transfer function for an AVP filter included in the current control loop $T_i$. The compensator transfer function $H_{PID}$ can also be a PID control.

The overall closed-loop transfer function $T_{vi}$ of the control loop compensator 112 is dependent on both the voltage loop and current loop response $T_v$, $T_i$, and is given by:

$$T_{vi} = \frac{T_v}{1 + T_i} \quad (1)$$

where $T_v = H_{PID} * G_{vd}$ and $T_i = H_{PID} * G_{id} * H_{AVP}$.
The overall closed-loop output impedance of the control loop compensator 112 is given by:

$$Z_{Ovi} = \frac{Z_0 + G_{ii} \times H_{AVP} \times T_{vi}}{1 + T_{vi}} \quad (2)$$

where $H_{AVP}$ is given by:

$$H_{AVP} = R_{LL}\left(\frac{K_{pAVP}}{1-(1-K_{pAVP})z^{-1}}\right) \quad (3)$$

and where $R_{LL}$ is the droop resistance and $K_{pAVP}$ is a single-pole filter coefficient that sets the AVP bandwidth.

The regulator parameter programming system 200 can automatically optimize and tune the control loop compensator 112 shown in FIG. 3 i.e. a PID compensation filter cascaded with a single-pole digital filter and a first order AVP. The overall transfer function of the PID-based compensator 112 is given by:

$$H_{PID}(z) = \left[\frac{K_I}{1-z^{-1}} + K_P + \left(\frac{1-z^{-N}}{N}\right)K_D\right]\left(\frac{K_{fp}}{1-(1-K_{fp})z^{-1}}\right) \quad (4)$$

Figure 4:
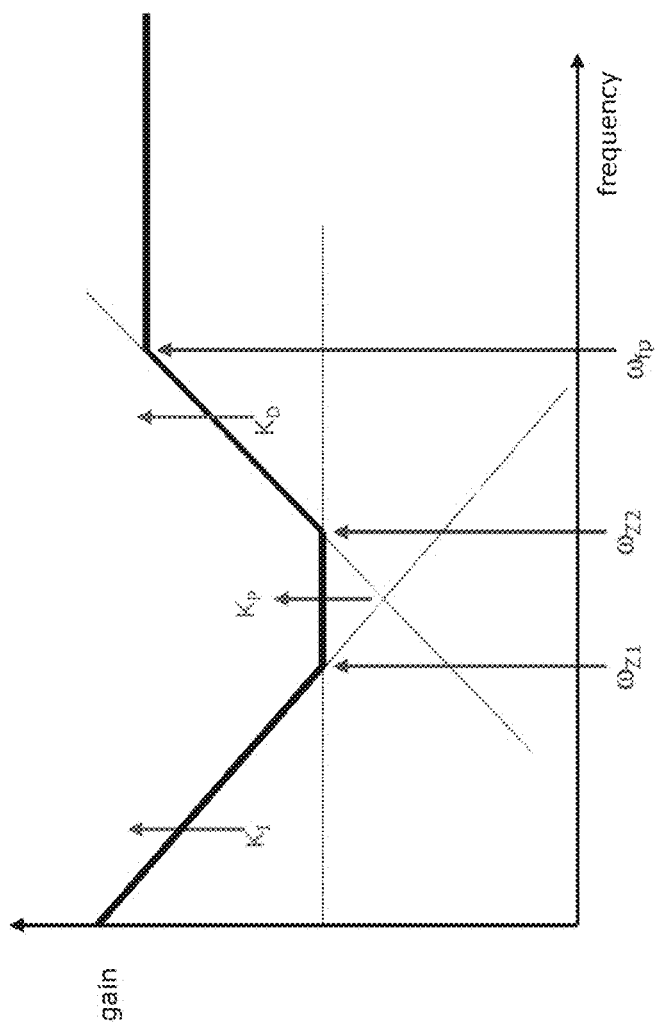
FIG. 4 illustrates a gain curve for a PID-based control loop compensator.

FIG. 4 shows the gain response of the PID-based compensator 112. The compensator filter coefficients $K_I$, $K_P$ and $K_D$ affect different regions of the gain curve, which are defined by frequencies $\omega_{z1}$, $\omega_{z2}$ and $\omega_{fp}$. The programmable control loop coefficients in this case are the PID compensation filter coefficients $K_P$, $K_I$ and $K_D$ and the post filter coefficient $K_{fp}$.

The regulator parameter programming system 200 optimizes the filter coefficients $K_I$, $K_P$, $K_D$ and $K_{fp}$ to flatten the output impedance response of the digital voltage regulator controller 104 for frequencies below a bandwidth of the digital controller 104. In one embodiment, the regulator parameter programming system 200 implements an algorithm that optimizes the output impedance, voltage loop and current loop bandwidths and stability with sequential design steps that converge on a solution. The optimization algorithm is described next with reference to FIGS. 5-8, which show screen captures from the programming system display 212 during different stages of the parameter optimization process.

Figure 5:
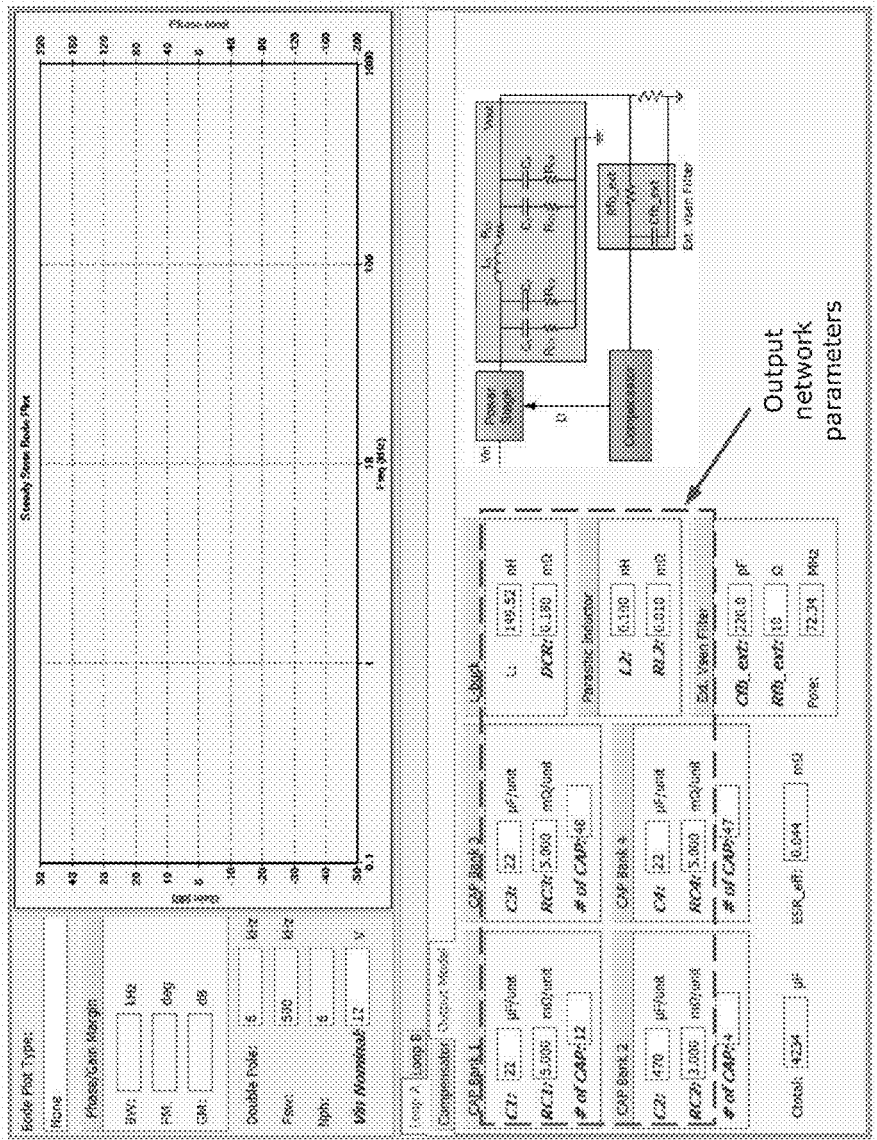

FIG. 5 illustrates a screen capture of an output network parameter initialization stage of the optimization algorithm. A schematic model of the output network that connects the power stage(s) 102 of the switching voltage regulator 104 to the load 106 is shown in this screen capture. In this purely exemplary embodiment of the output network, the output network includes four capacitor banks ('CAP Bank 1', 'CAP Bank 2', 'CAP Bank 3' and 'CAP Bank 4'), an output inductor (not shown in FIG. 5, see FIG. 1 instead) having an equivalent series resistance (DCR), a parasitic inductor (L2) and resistor (RL2), and an external voltage sense filter (Vsen) that includes a feedback capacitor (Cfb_ext) and feedback resistor (Rfb_ext) for sensing the regulator output voltage Vout. The component values are entered during the initialization stage. The output inductor corresponds to the generic inductors L shown in FIG. 1, and the capacitor banks correspond to the generic output capacitor Cout shown in FIG. 1. Each capacitor bank includes a number of capacitors ('# of CAP'), and has a defined capacitance (C1, C2, C3, C4) and equivalent series resistance (RC1, RC2, RC3, RC4). FIG. 5 shows non-limiting and purely exemplary values entered for the parameters of the output network.

Figure 6:
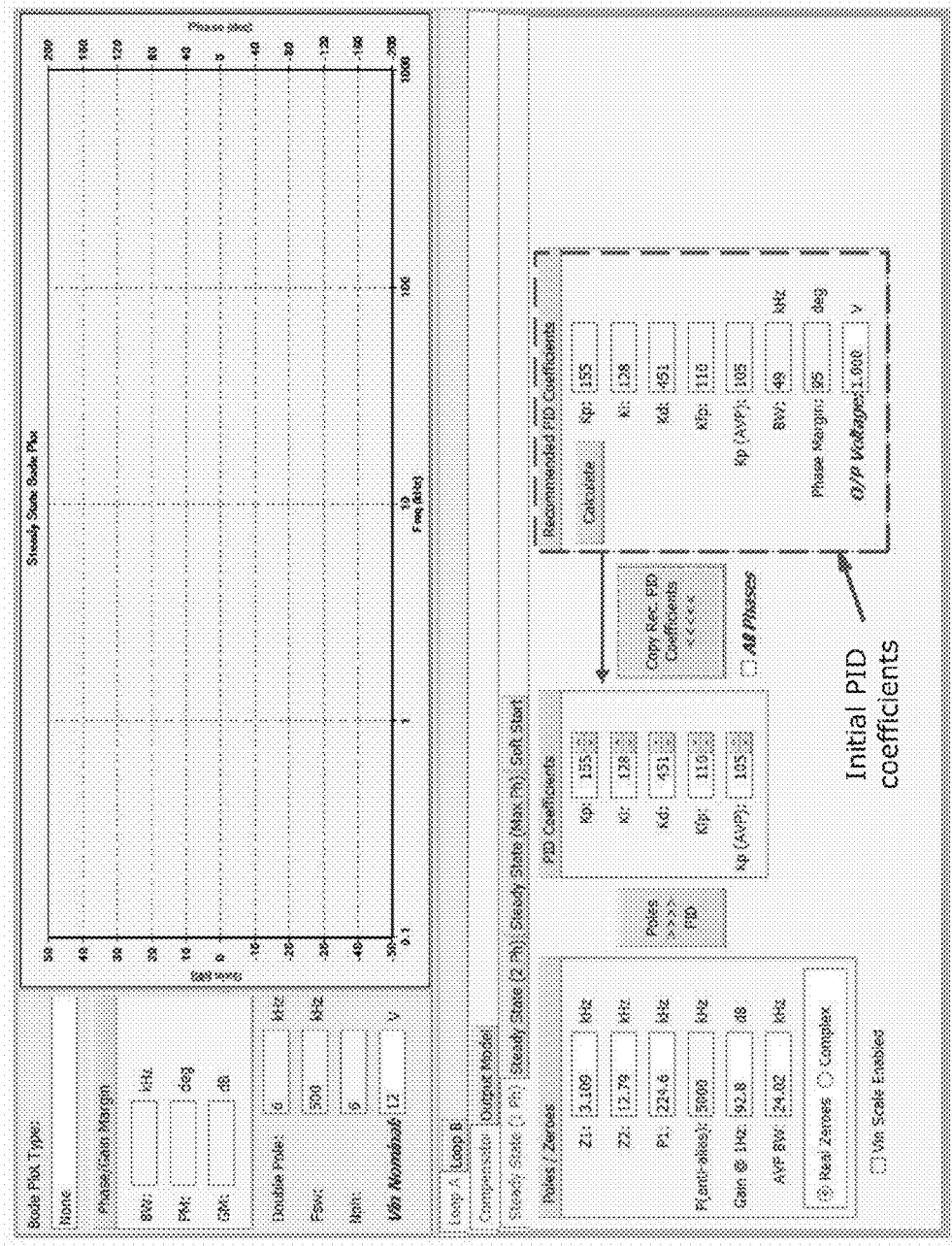

FIG. 6 illustrates a compensator parameter initialization stage of the optimization algorithm. During this stage, initial gain values are selected for the PID coefficients $K_P$, $K_I$ and $K_D$ to maximize the controller bandwidth (BW) at a particular phase margin (PM) target e.g. 63 kHz BW at 93 degrees PM. If the control loop compensator 112 of the digital controller 102 also includes a single-pole digital filter cascaded with the PID filter and a first order AVP filter as previously described herein in connection with FIG. 3, the gain coefficient $K_{fp}$ of the single-pole digital filter and the gain coefficient $K_p$ (AVP) of the first order AVP filter can also be initially determined during this stage.

The regulator parameter programming system 200 uses the initial control loop coefficients entered by the user to calculate the poles (P1) and zeroes (Z1, Z2) of the control loop compensator 112 for a specific AVP bandwidth (35.82 kHz in this non-limiting example) and gain (92.8 dB in this non-limiting example). Some or all of the compensator gain coefficients $K_P$, $K_I$, $K_D$, $K_{fp}$, and $K_p$ can be reduced if desired to increase regulator stability. In each case, the regulator parameter programming system 200 then provides corresponding system responses based on the previously determined control loop coefficients, including loop gains with and without AVP and output impedance with and without AVP.

Figure 7A:
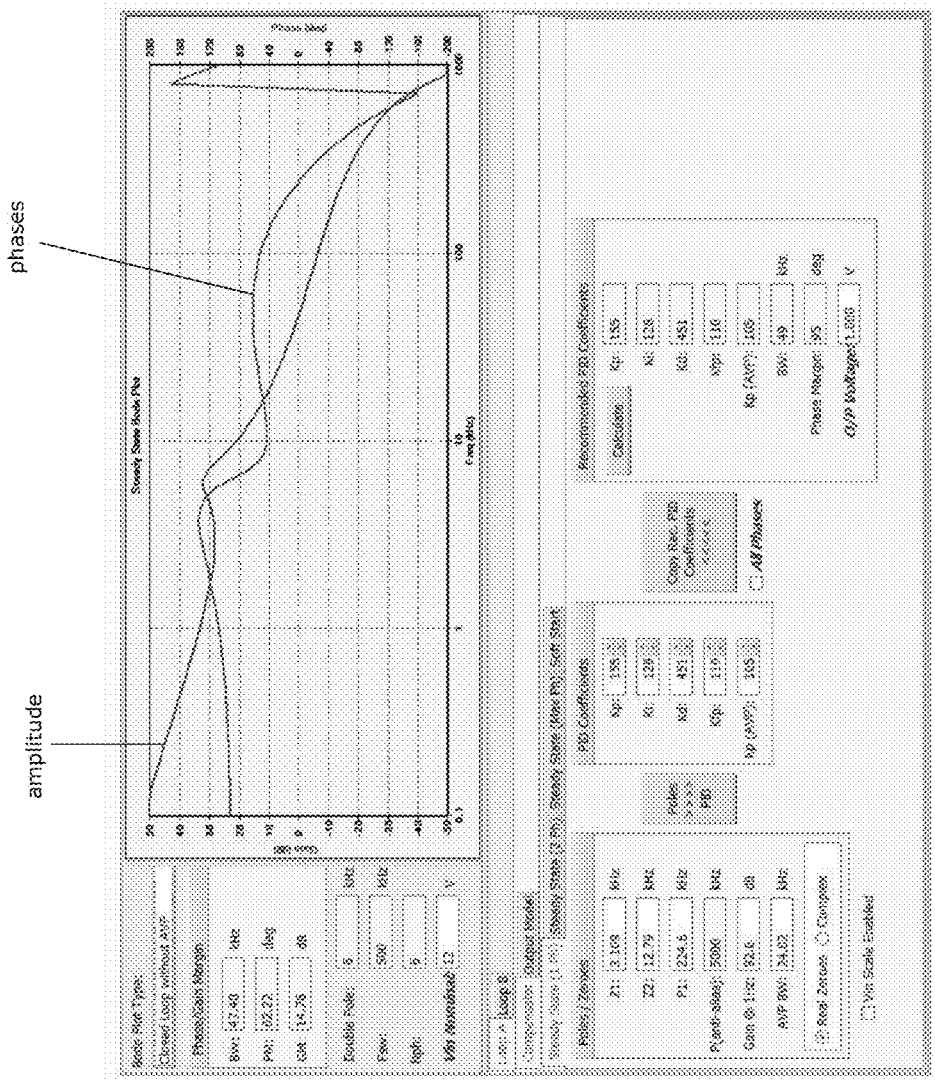

FIG. 7A illustrates the loop gain and phases without AVP for the initial control loop coefficients $K_P$, $K_I$, $K_D$, $K_{fp}$, and $K_p$.

Figure 7B:
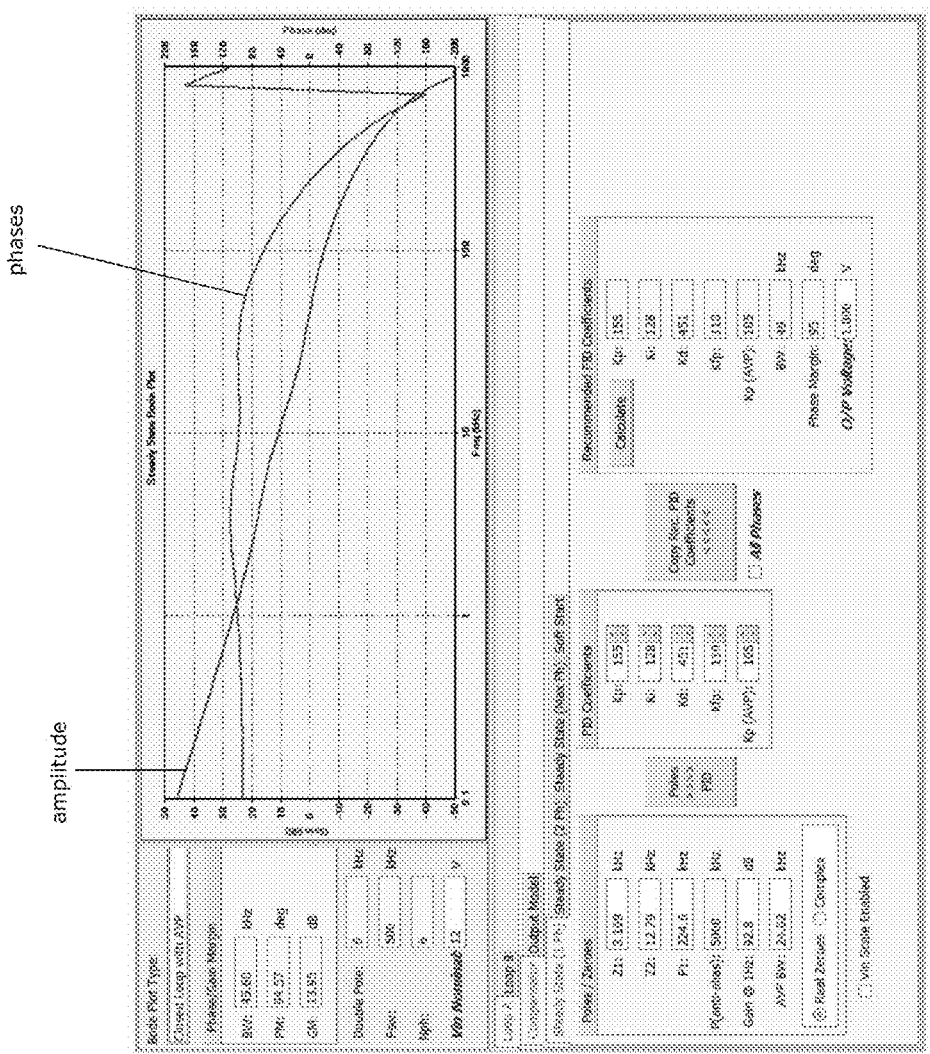

FIG. 7B illustrates the loop gain and phases with AVP for the initial control loop coefficients $K_P$, $K_I$, $K_D$, $K_{fp}$, and $K_p$.

Figure 8A:
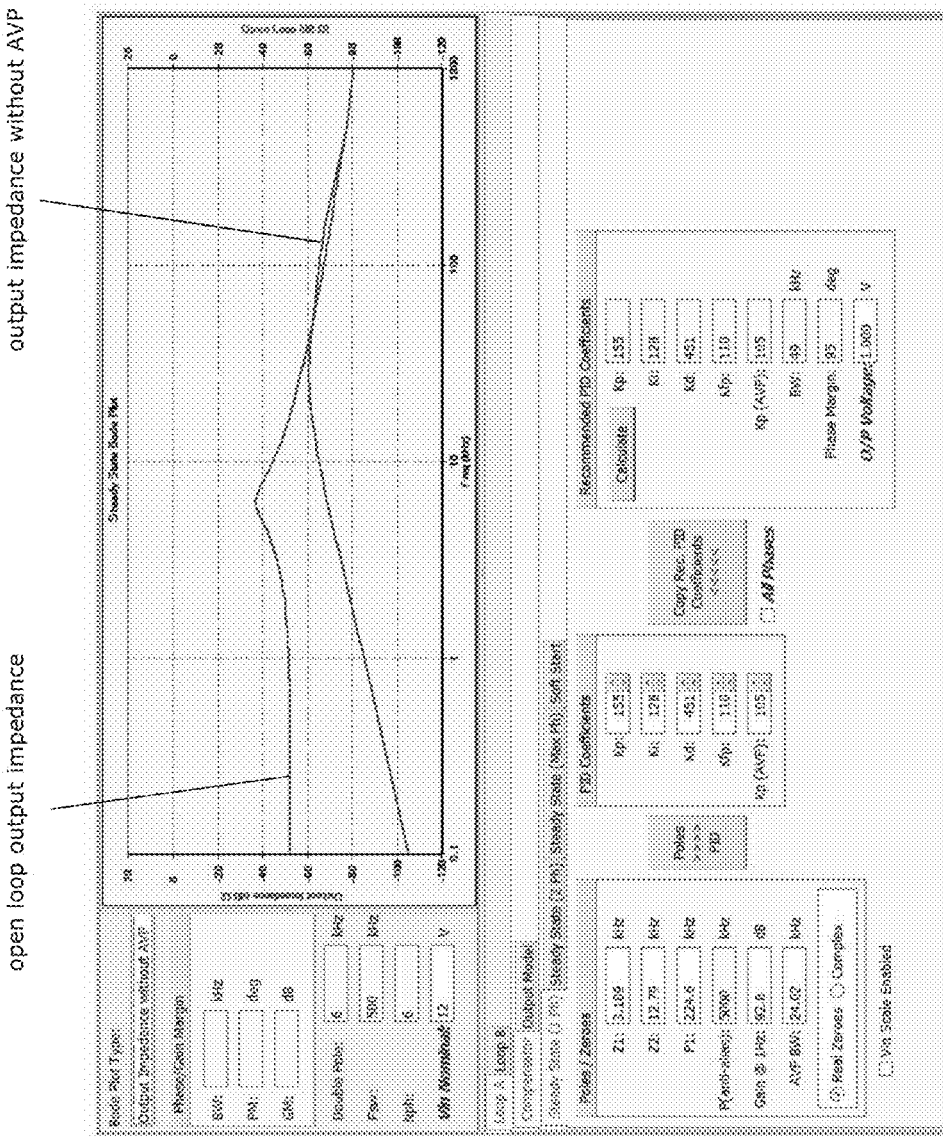

FIG. 8A illustrates open loop output impedance and output impedance without AVP for the initial control loop coefficients $K_P$, $K_I$, $K_D$, $K_{fp}$, and $K_p$.

Figure 8B:
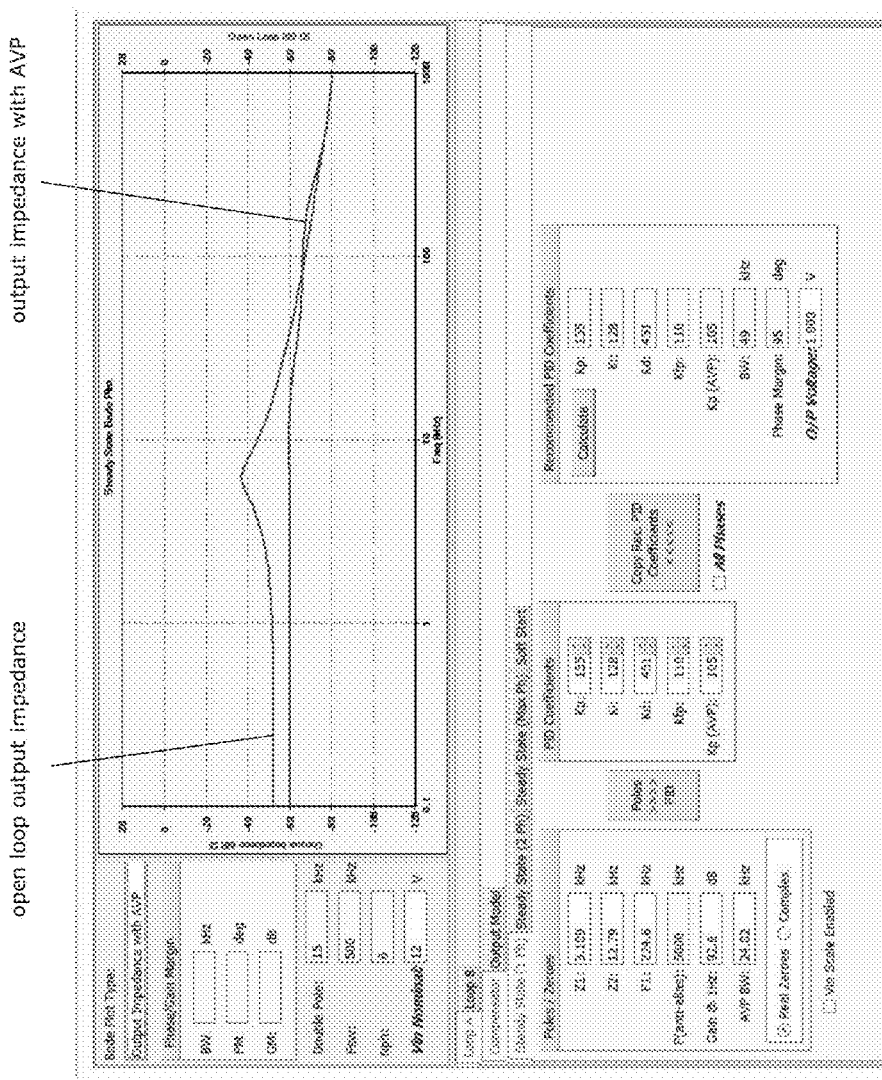

FIG. 8B illustrates open loop output impedance and output impedance with AVP for the initial control loop coefficients $K_P$, $K_I$, $K_D$, $K_{fp}$, and $K_p$.

The system responses provided by the regulator parameter programming system 200 can be inspected to determine whether further adjustments to one or more of the control loop coefficients are desirable. This can include manual adjustments by the user and/or automatic adjustments by the programming system 200. The GUI interface provided by the regulator parameter programming system 200 allows the user to iteratively change one or more of the control loop coefficients and immediately see the effect on system response.

For example, one or more of the PID coefficients $K_P$, $K_I$, and $K_D$ can be re-determined to optimize the output impedance transfer function of the digital voltage regulator controller 104. The output impedance transfer function corresponds to the output impedance response of the digital controller 104, and is illustrated in FIG. 8A without AVP and in FIG. 8B with AVP. For example, one or more of the PID coefficients $K_P$, $K_I$ and $K_D$ can be adjusted to flatten the output impedance response of the digital controller 104. The optimized solution can be evaluated and re-tuned in an iterative manner e.g. by analyzing one or more of the following bode plots provided by the regulator parameter programming system 200: open loop gain ($T_v$); closed loop gain ($T_{vi}$) with and without AVP; open loop output impedance ($Z_o$); closed loop output impedance with and without AVP ($Z_{ovi}$); and compensator gain ($H_{PID}$).

Described next is another illustrative embodiment of the control loop coefficient optimization algorithm implemented by the regulator parameter programming system 200. According to this embodiment, the initialization stage includes determining the control loop coefficients $K_P$, $K_I$, $K_D$, and $K_{fp}$ such that the voltage control loop $T_v$ is optimized. The post filter coefficient $K_{fp}$ can be determined based on a nonlinear function of ($N_{ph}$, $N_{ph\_max}$, $Z_{esr}$, $F_{sw}$) where $N_{ph}$ is the regulator power stage 102 under consideration, $N_{ph\_max}$ is the total number of regulator power stages 102, $Z_{esr}$ is the zero introduced by the ESR, and $F_{sw}$ is the frequency at which the digital controller 104 switches the power stages 102 of the switching voltage regulator 100. In one example, $K_{fp}=\text{Max}(\alpha \times Z_{esr}, \beta \times (N_{ph}/N_{ph\_max})F_{sw})$ where $0.5<\alpha<2$ and $0.5<\beta<2$ are scaling factors.

The regulator parameter programming system 200 then determines Fo_$T_v$($N_{ph}$,$N_{ph\_max}$,$Z_{esr}$,$F_{sw}$)—the voltage loop target BW, where Fo_$T_v$ is typically between $Fsw \times f(N_{ph}/N_{ph\_max})/g_{max}$ and $Fsw \times f(N_{ph}/N_{ph\_max})/g_{min}$ and $g_{Max}$ and $g_{min}$ are piecewise linear functions of $F_{sw}$. In one example, $$f(N_{ph}/N_{ph\_max}) = \sqrt{\frac{N_{ph}+\gamma}{N_{ph\_max}+\gamma}}$$

where y is a real number.

The regulator parameter programming system 200 then starts a search of Fo_$T_v$ as given by:

$$Fsw \times f(N_{ph}/N_{pn\ max})/g_{min} \rightarrow Fsw \times f(N_{ph}/N_{ph\ max})/g_{Max} \quad (5)$$

The regulator parameter programming system 200 optimizes $K_d$ to obtain the target Fo_$T_v$. Next, the regulator parameter programming system 200 calculates $K_i$ for double pole cancellation as given by:

$$Ki=Kd(2\pi/Fs(L\_\text{double\_pole}))^2 \quad (6)$$

where Fs is the sampling rate, 1/Fs is the sampling period Ts, and L_double_pole is the place of the load double pole~1/Sqrt(LC).

The regulator parameter programming system 200 then calculates $K_p=\alpha*Ki/2/3.14/Ts/Fo\_T_v$ where $\alpha$ can be a piecewise function or a scaling factor determined by the user. The regulator parameter programming system 200 locally adjusts $K_p$, $K_i$, $K_d$ for maximum phase margin. If the solution does not meet the system criteria, Fo_$T_v$ is reduced according to equation (5) and the process starts over. The regulator parameter programming system 200 starts with the minimum $K_p$ (AVP) index, computes $T_{vi}$ and checks $T_{vi}$ in the region of interest for the following conditions:

$$T_{vi}>1.65 \text{ dB for } f<0.8*Fo\_T_v;$$

$$Fo\_T_{vi}>Fo\_T_v;$$

$$PM\_T_{vi} >0.9*PM\_T_v; \text{ and}$$

$$dT_{vi}/T_{vi}/df/f>0.25 \text{ (5 dB/decade) between}$$
$$0.925*Fo\_T_v \text{ and } 1.075*Fo\_T_v,$$

where $T_v$ is the open loop gain, $T_{vi}$ is the closed loop gain and PM is the phase margin target. If these conditions are met, $K_p$ (AVP) is increased and the procedure is carried out again. Otherwise the control loop coefficient initial optimization stops.

The regulator parameter programming system 200 then reduces peaks or bumps in the output impedance response which result from the initial set of control loop coefficients. For example, the regulator parameter programming system 200 defines a search region around $K_p$, $K_d$ and $K_{fp}$ and checks the output impedance curve with the goal of achieving an output impedance as flat as possible for frequencies lower than the controller bandwidth.

Figure 9:
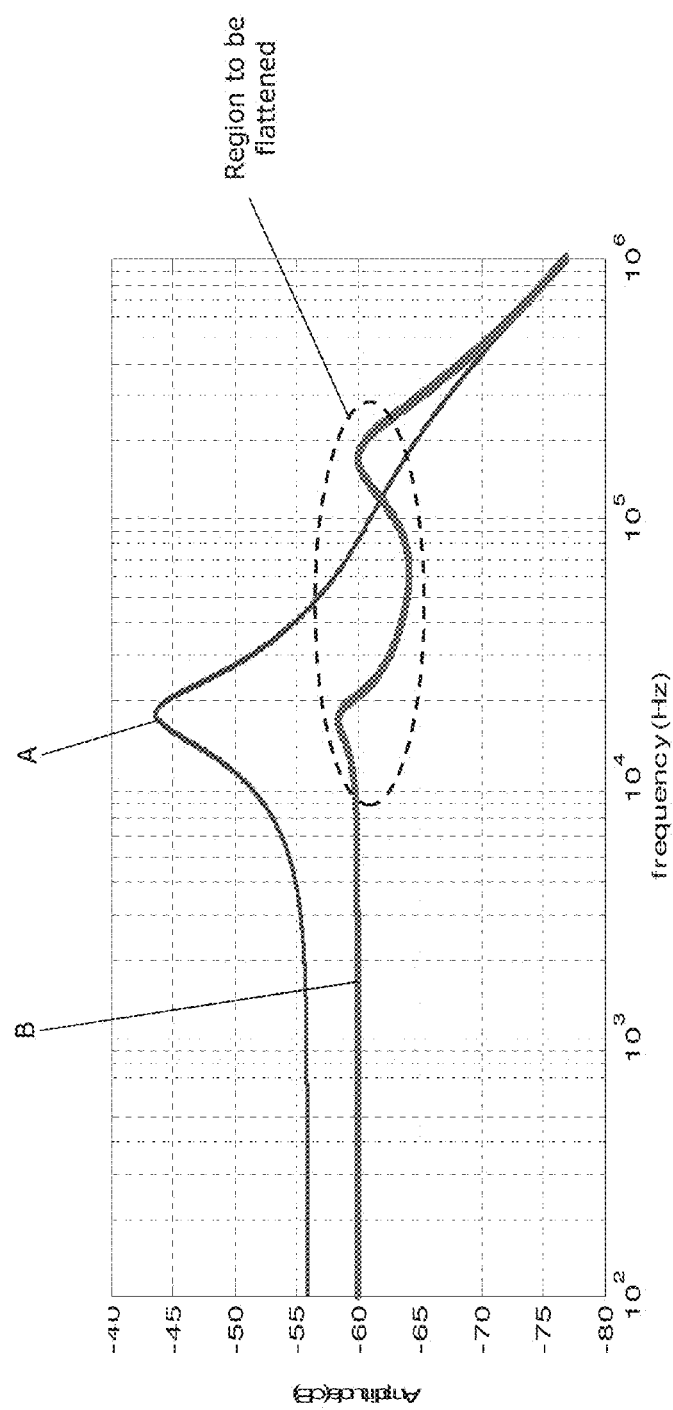
FIG. 9 illustrates an exemplary plot diagram showing open loop and PID output impedance curves generated based on an exemplary set of initial control loop coefficients.

FIG. 9 illustrates an exemplary plot diagram showing the open loop (curve A) and PID (curve B) output impedance curves generated based on an exemplary set of initial control loop coefficients. The regulator parameter programming system 200 can re-optimize $K_p$ inside the searching band to flatten the middle part of the region of interest. The regulator parameter programming system 200 can similarly re-optimize $K_I$ to flatten the beginning part of the region of interest and re-optimize $K_D$ to flatten the end part of the region of interest (see FIG. 4 for effect of $K_i$, $K_p$ and $K_D$ on different regions of the gain response). In each control loop coefficient re-optimization process, the other criteria mentioned previously herein should be checked.

In general, the control loop coefficients can be calculated automatically based on the values optimized in certain cases. For example in a multiphase switching voltage regulator e.g. as shown in FIG. 1, the PID coefficients can be optimized and tuned for one phase, two phases and the maximum number ($N_{ph\_max}$) of phases, where $N_{ph\_max} \geq 3$ and the term 'phase' corresponds to one power stage 102 of the multiphase regulator 100. Control loop coefficients for the intermediate phases can then be calculated based on these cases using a nonlinear interpolation formula e.g. as given by:

$$K_{ph\_i} = \omega K_{ph\_2} + (1-\omega) K_{ph\_Max} \qquad (7)$$

where $K_{ph\_i}$ is a particular control parameter for the $i^{th}$ phase, $K_{ph\_2}$ is the same control parameter for the second phase, $K_{ph\_Max}$ is the same control parameter for the $N_{ph\_max}$ phase, and $$\omega = \frac{\sqrt{N_{ph\_i}} - \sqrt{N_{ph\_Max}}}{\sqrt{2} - \sqrt{N_{ph\_Max}}}.$$

Figure 10:
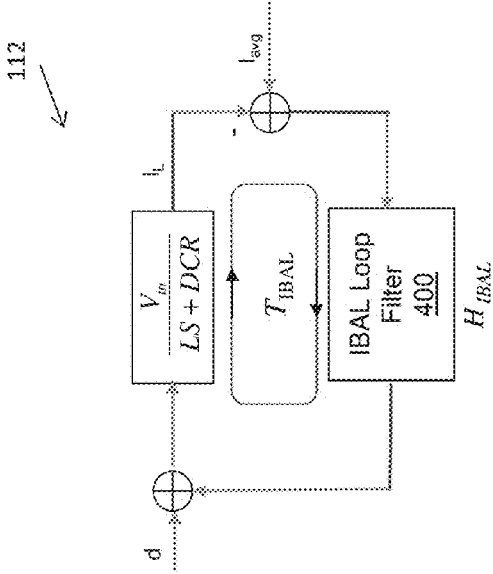
FIG. 10 illustrates a block diagram of another embodiment of a control loop compensator for a switching voltage regulator.

FIG. 10 illustrates a block diagram of another embodiment of the control loop compensator 112 of the digital regulator controller 104. According to this embodiment, the control loop compensator 112 includes a PID-based compensation filter e.g. as shown in FIG. 3 and a current balance filter 400 implemented as PI (proportional-integral) filter. The current balance filter 400 provides a pulse width adjustment in each phase of the switching voltage regulator 100 to maintain current balance in a multiphase system, e.g. by converting phase current information into corresponding adjustments to the duty cycle of each individual power stage 102 to adjust the phase currents so they remain balanced.

The current balance loop bandwidth can be chosen to minimize interaction with the voltage loop $T_v$. For example, $K_{p\_IBAL}$ and $K_{I\_hd\_BAL}$ can be selected such that:

$$BW_{IB} \approx \frac{BW}{5} \qquad (8)$$

where $BW_{IB}$ is the current balance loop bandwidth which is typically set to be roughly ⅕ or so of the system bandwidth.

Figure 11:
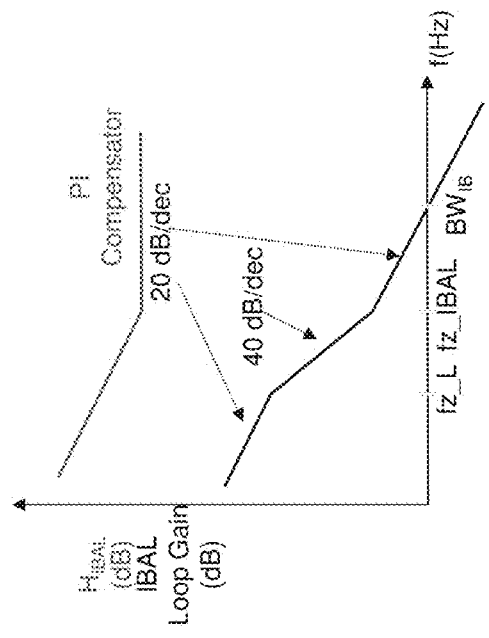
FIG. 11 plots different gain response for the control loop compensator of FIG. 10.

FIG. 11 plots $H_{IBAL}$ and the current balance loop gain (in dB) over frequency for the control loop compensator 112 of FIG. 10, where $T_{IBAL} = Vin/(LS+DCR)*H_{IBAL}$, fz_L=DCR/L (zero resulting from the inductor and series resistance), and fz_IBAL=BW_IBAL/10. The transfer function $H_{IBAL}$ of the current balance filter 400 can be implemented e.g. via a PI filter represented by ($K_{p\_ibal} + K_{IBAL}/(1-Z^{-1})$) or a P (proportional) filter represented by ($K_{p\_ibal}$).

After the parameter optimization process is complete, including output impedance response flattening, the regulator parameter programming system 200 can transfer the optimized control loop coefficients to the digital controller 104 via a wired or wireless interface 202 as shown in FIG. 1. The control loop compensator 112 of the digital controller 104 uses the transferred control loop coefficients to perform closed-loop impedance response compensation as previously described herein. In another embodiment, the regulator parameter programming system 200 stores the optimized control loop coefficients in memory 216 such as memory of the switching voltage regulator 100 accessible by the digital voltage regulator controller 104. The digital controller 104 retrieves the stored control loop coefficients from the memory 216 for use in performing closed-loop impedance response compensation as previously described herein.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of determining control loop coefficients of a digital voltage regulator controller, the method comprising:
    determining PID (proportional-integral-derivative) coefficients that meet gain and phase margin targets of a digital voltage regulator controller, as a function of a plurality of system parameters of the digital voltage regulator controller; and
    optimizing one or more of the PID coefficients based on an output impedance closed loop response of the digital voltage regulator controller, wherein the one or more of the PID coefficients are optimized when a peak of the output impedance over frequency is minimized for frequencies below a bandwidth of the digital voltage regulator controller.

2. The method of claim 1, further comprising:
    permitting manual adjustment of the PID coefficients after optimizing one or more of the PID coefficients to flatten the output impedance response for frequencies below the bandwidth of the digital voltage regulator controller.

3. The method of claim 2, further comprising:
    providing a visual display of at least one of an open-loop gain response of the digital voltage regulator controller over frequency, a closed-loop gain response of the digital voltage regulator controller over frequency, and the output impedance response of the digital voltage regulator controller over frequency to aid in the manual adjustment of the one or more PID coefficients.

4. The method of claim 1, wherein optimizing one or more of the PID coefficients comprises optimizing a proportional gain and a derivative gain of the digital voltage regulator controller to flatten the output impedance closed loop response for frequencies below the bandwidth of the digital voltage regulator controller.

5. The method of claim 1, wherein the PID coefficients are determined as a function of a switching frequency implemented by the digital voltage regulator controller in switching one or more power stages for driving a load, a number of active power stages controlled by the digital voltage regulator controller and a maximum number of power stages for which the digital voltage regulator controller is programmed to control.

6. The method of claim 1, further comprising:
determining a post-filter coefficient and the PID coefficients so that the gain and phase margin targets are satisfied, as a function of the system parameters; and
optimizing the post-filter coefficient and one or more of the PID coefficients based on the output impedance closed loop response of the digital voltage regulator controller, wherein the post-filter coefficient and the one or more of the PID coefficients are optimized when the peak of the output impedance over frequency is minimized for frequencies below the bandwidth of the digital voltage regulator controller.

7. The method of claim I, further comprising:
determining an adaptive voltage position (AVP) filter coefficient that meets a maximum output impedance target of the digital voltage regulator controller; and
optimizing the AVP filter coefficient and one or more of the PID coefficients based on the output impedance closed loop response of the digital voltage regulator controller, wherein the AVP filter coefficient and the one or more of the PID coefficients are optimized when the peak of the output impedance over frequency is minimized for frequencies below the bandwidth of the digital voltage regulator controller.

8. The method of claim 1, further comprising:
determining a proportional gain and an integral gain for a current balance filter of the digital voltage regulator controller so that a bandwidth of the current balance filter is a fraction of the bandwidth of the digital voltage regulator controller.

9. The method of claim 1, wherein the digital voltage regulator controller is a multi-phase digital voltage regulator controller and wherein the PID coefficients for one or more of the phases are determined using a nonlinear interpolation formula.

10. The method of claim 1, further comprising:
transferring the PID coefficients to the digital controller via a hardware interface such that the digital voltage regulator controller uses the transferred PID coefficients to perform closed-loop impedance response compensation.

11. The method of claim 1, further comprising:
storing the PID coefficients in memory such that he digital voltage regulator controller uses the stored PID coefficients to perform closed-loop impedance response compensation.

12. A non-transitory computer readable medium storing a computer program operable to determine control loop coefficients of a digital voltage regulator controller, the computer program comprising:
program instructions to determine PID (proportioal-integral-derivative) coefficients that meet gain and phase margin targets of a digital voltage regulator controller, as a function of a plurality of system parameters of the digital voltage regulator controller; and
program instructions to optimize one or more of the PID coefficients based on an output impedance closed loop response of the digital voltage regulator controller, wherein the one or more of the PID coefficients are optimized when a peak of the output impedance over frequency is minimized for frequencies below a bandwidth of the digital voltage regulator controller.

13. The non-transitory computer readable medium of claim 12, wherein the program instructions to optimize one or more of the PID coefficients comprise program instructions to optimize a proportional gain and a derivative gain of the digital voltage regulator controller to flatten the output impedance closed loop response for frequencies below the bandwidth of the digital voltage regulator controller.

14. The non-transitory computer readable medium of claim 12, wherein the PID coefficients are determined as a function of a switching frequency implemented by the digital voltage regulator controller in switching one or more power stages for driving a load, a number of active power stages controlled by the digital voltage regulator controller and a maximum number of power stages for which the digital voltage regulator controller is programmed to control.

15. The non-transitory computer readable medium of claim 12, further comprising:
program instructions to determine a post-filter coefficient and the PID coefficients so that the gain and phase margin targets are satisfied, as a function of the system parameters; and
program instructions to optimize the post-filter coefficient and one or more of the PID coefficients based on the output impedance closed loop response of the digital voltage regulator controller, wherein the post-filter coefficient and the one or more of the PID coefficients are optimized when the peak of the output impedance over frequency is minimized for frequencies below the bandwidth of the digital voltage regulator controller.

16. The non-transitory computer readable medium of claim 12, further comprising:
program instructions to determine an adaptive voltage position (AVP) filter coefficient that meets a maximum output impedance target of the digital voltage regulator controller; and
program instructions to optimize the AVP filter coefficient and one or more of the PID coefficients based on the output impedance closed loop response of the digital voltage regulator controller, wherein the AVP filter coefficient and the one or more of the PID coefficients are optimized when the peak of the output impedance over frequency is minimized for frequencies below the bandwidth of the digital voltage regulator controller.

17. The non-transitory computer readable medium of claim 12, further comprising:
program instructions to determine a proportional gain and an integral gain for a current balance filter of the digital voltage regulator controller so that a bandwidth of the current balance filter is a fraction of the bandwidth of the digital voltage regulator controller.

18. The non-transitory computer readable medium of claim 12, wherein the digital voltage regulator controller is a multi-phase digital voltage regulator controller and wherein the PID coefficients for one or more of the phases are determined using a nonlinear interpolation formula.

19. The non-transitory computer readable medium of claim 12, further comprising program instructions to transfer the PID coefficient parameters from the computer program via a wired or wireless interface.

* * * * *

UNITED STATES PATENT AND TRADEMARK OFFICE
CERTIFICATE OF CORRECTION

Page 1 of 1

PATENT NO. : 9,698,683 B2
APPLICATION NO. : 14/328931
DATED : July 4, 2017
INVENTOR(S) : A. Babazadeh et al.

It is certified that error appears in the above-identified patent and that said Letters Patent is hereby corrected as shown below:

In the Claims

Column 11, Line 46 (Claim 11, Line 2) please change "that he" to -- that the --
Column 11, Line 54 (Claim 12, Line 5) please change "(proportioal" to -- (proportional --

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*